United States Patent [19]
Chromy

[11] 3,808,938
[45] May 7, 1974

[54] EXPANSION DOWEL CONSTRUCTION

[75] Inventor: Franz Chromy, Feldkirch-Levis, Austria

[73] Assignee: Palar (Curcao) N.V., Curacao, Netherlands Antilles

[22] Filed: June 1, 1972

[21] Appl. No.: 258,862

Related U.S. Application Data
[63] Continuation-in-part of Ser. No. 59,123, July 29, 1970, abandoned.

[30] Foreign Application Priority Data
Aug. 4, 1969  Germany................... 6930827[U]

[52] U.S. Cl. ............................................. 85/83
[51] Int. Cl. ............................................. F16b 13/04
[58] Field of Search ................ 85/83, 84; 151/41.73

[56] References Cited
UNITED STATES PATENTS
| | | | |
|---|---|---|---|
| 734,326 | 7/1903 | Hicks | 85/83 |
| 2,370,327 | 2/1945 | Rosan | 151/41.73 |
| 3,498,353 | 3/1970 | Barry | 151/41.73 |
| 1,580,569 | 4/1926 | Pleister et al. | 85/84 |

FOREIGN PATENTS OR APPLICATIONS
| | | | |
|---|---|---|---|
| 335,508 | 9/1930 | Great Britain | 85/84 |

*Primary Examiner*—Edward C. Allen
*Attorney, Agent, or Firm*—Toren & McGeady

[57] ABSTRACT

An expansion dowel is formed of a sleeve which defines a through bore. For securing the dowel into a hard fastening material, such as concrete, an expansion body is driven into the through bore from its rear end toward its forward end. At its forward end the sleeve is slotted for a portion of its length at circumferentially spaced positions. At its rear end the sleeve has a female thread. To increasing the holding action of the sleeve in the fastening material a plurality of closely spaced, radially extending thin fin-like elements are formed on the exterior surface of the sleeve from its forward end for the entire expansion range of the dowel. For a dowel with an outside diameter of 20 mm, the elements have a pitch of about 0.5 mm.

1 Claim, 1 Drawing Figure

PATENTED MAY 7 1974
3,808,938
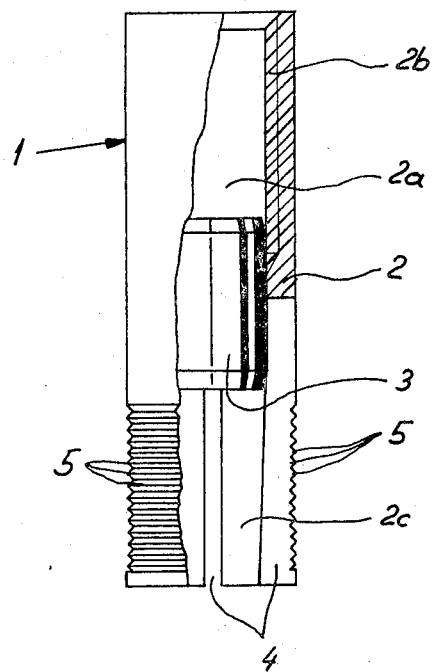
INVENTOR
FRANZ CHROMY
By- McGlew and Toren
Attorneys

3,808,938

EXPANSION DOWEL CONSTRUCTION

This is a continuation-in-part application of Ser. No. 59,123 filed July 29, 1970 and now abandoned.

SUMMARY OF THE INVENTION

This invention relates in general to the construction of dowels, and in particular, to a new and useful expansion-type dowel formed of a metal sleeve with a through bore into which an expansion body is driven. A female thread is provided within the through bore for receiving a fastening screw. Radial fins are provided on the forward exterior end of the metal sleeve for increasing the gripping action of the sleeve as it is expanded into a hard fastening material.

Known dowels of the expansion-type have, at the forward or front end of the dowel shell, three to four radial fins which penetrate into the fastening material during the expansion of the dowel for establishing a combination friction and form lock between the dowel shell and the fastening material. The radial fins are provided to increase the radial pressure which is exerted by the expansion body on the dowel wall and the friction between the dowel shell and the fastening material. Since the radial pressure is limited by the yield point of the dowel material, the holding fins penetrate only a small amount into the hard fastening materials of a type such as concrete. Consequently, the holding force is not markedly increased in known dowels which include only three to four radial fins.

The primary object of the invention is to provide a dowel construction having a substantially greater holding force than the known dowels when expanded into a hard fastening materials. This problem is solved, in accordance with the invention by providing a small radial fin formation on the exterior of the dowel sleeve which extends over the entire expansion range of the dowel sleeve. The radial fin formation consists of thin elements having a pitch of about 0.5 mm when an outside dowel diameter of 20 mm is employed. Because there are a plurality of the small thin radial fins, located over the entire expansion range on the exterior of the dowel shell, the positions where a combined friction and form lock is provided are increased by a multiple so that the holding force is substantially increased with the same radial pressure on the expansion body. Since the pitch of the individual radial fins is about 0.5 mm when an outside dowel diameter of approximately 20 mm is used, 20 fins can be arranged on the dowel shell over a length of 10 mm, so that each individual fin forms a combined friction and form lock with the fastening material. For the same length, the known dowels have only two to three fins for affording a combined friction and form lock with the fastening material.

Therefore, based on the invention a dowel is provided which includes a sleeve having a through bore into which an expansion body is driven. One end of the sleeve has longitudinally extending angularly spaced slots arranged on its periphery and radially extending thin fin-like projections on its outer surface which extend over the entire expansion range of the dowel and advantageously are of a pitch of about 0.5 mm when the sleeve diameter is of the order of 20 mm.

A further object of the invention is to provide a dowel which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

The only FIGURE in the drawing is a partial elevational and partial axial sectional view of a dowel constructed in accordance with the invention.

GENERAL DESCRIPTION OF THE PREFERRED EMBODIMENT

Referring to the drawing, a dowel 1 is illustrated which includes a dowel sleeve 2 forming a through bore 2a into which a cylindrical expansion body 3 is driven for fixing the dowel into a hole formed in a hard fastening material, such as concrete. The outer or forward end of the dowel, that is the leading end in the direction in which it is inserted into a hole, is provided with an interior conical taper 2c, diverging from the forward end, and a plurality of slots 4 which extend in the axial direction of the sleeve from its forward end over the entire expansion area. The slots 4 facilitate the expansion of the dowel sleeve 2 when the expansion body 3 is driven toward the forward end. At its rear end the sleeve is provided with a female thread 2b for receiving a fastening screw, not shown.

In accordance with the invention, on the exterior of the forward third of the dowel sleeve 2, a plurality of small thin radial extending fins 5 are formed for penetrating into the material into which the dowel is secured when the dowel sleeve 2 is expanded. The fins 5 are formed over the expansion portion of the sleeve 2 and the fins have a pitch of about 0.5 mm when the dowel is of a diameter on the order of 20 mm. This construction makes it possible to form the maximum number of projections on the exterior of the dowel sleeve in order to provide adequate securement of the dowel to a hard fastening material such as concrete.

What is claimed is:

1. An expansion dowel for use in a hard fastening material such as concrete, comprising an axially extending sleeve member having a forward end and a rearward end relative to the direction of insertion of the dowel into a material into which it is positioned, said sleeve member having a generally uniform external diameter and a continuous interior bore for its full axial length from its forward end to its rearward end, said sleeve having an expansion range extending from its forward end for a portion of its axial length, said sleeve member having a plurality of circumferentially spaced narrow slots extending in the axial direction and passing through its wall, said slots being open through the forward end of said sleeve and extending from the forward end toward the rearward end of said sleeve member for a portion of its axial length at least equal to the expansion range of said sleeve member, a plurality of continuously arranged circumferentially extending radially outwardly projecting individual annular fins formed on the exterior surface of said sleeve member and extending from its forward end for approximately a third of the axial length of said sleeve member and for substantially the entire expansion range of said sleeve member, said fins having a center to center spacing in the range of about one-fortieth the outside diameter of said sleeve member, said sleeve member having a female thread within its bore with the trailing end of said female thread located at the rearward end of said bore and with its leading end located between the rearward end of said bore and the end of said fins on the exterior surface of said sleeve member located closer to the rearward end of said bore, said female thread being arranged for receiving a fastening screw, the surface of said bore extending from the forward end of said sleeve member is in diverging relationship toward the rearward end of said sleeve member to a location positioned intermediate the forward end of the bore and the leading end of said female thread, and the opening in the forward end of said bore is a continuation of the surface of said bore which converges toward said forward end.

* * * * *